Patented June 29, 1943

2,322,759

UNITED STATES PATENT OFFICE 2,322,759

COMPOSITION AND METHOD

John F. Lontz, Wilmington, Del., assignor to E. I. du Pont de Nemours & Company, Wilmington, Del., a corporation of Delaware No Drawing. Application February 20, 1942, Serial No. 431,694

18 Claims. (Cl. 47—58)

This invention relates to plane regulants and is particularly directed to plant regulant compositions containing as an essential active ingredient a compound selected from the class consisting of mononaphthyl and monochloronaphthyl ethers of aliphatic hydrocarbon diols having not more than four carbon atoms between the hydroxyl groups.

In the science of phytology, or plant physiology, it is universally recognized that certain factors regarded as growth regulators or growth promoting substances are responsible for the fundamental and directive development of plant life. These regulators have been isolated from vegetative and reproductive parts of a variety of plants, pollens, the endosperm of many seeds, fungi and urine, and have been identified as to their chemical structure. In addition, a number of synthetic compounds displaying regulatory effects similar to those of the naturally occurring products have also been discovered. These plant growth substances, also known as auxins, plant hormones, plant growth stimulants, and referred to herein simply as "plant regulants," in very minute quantities control or regulate the growth of the plant cell, a property which can be determined qualitatively and quantitatively by such standard test procedures known as the Avena coleoptile curvature test of Boysen-Jensen ("Growth Hormones in Plants." Translated and revised by G. S. Avery, Jr., and P. R. Burkholder. McGraw-Hill, New York), the Avena cylinder or straight growth test of Thimann (Proc. Acad. Sci., Amsterdam vol. 38, p. 896–912 (1935), the split pea stem curvature test of Went (Proc. Acad. Sci., Amsterdam vol. 37, p. 547 (1934)), and the green tissue test of Hitchcock & Zimmerman (Contributions from Boyce-Thompson Institute, vol. 9, No. 5, p. 463–518 (1938)).

While fundamentally these substances control the development of the cell, particularly its elongation and division, the total or superficial responses to these substances are manifested in such various ways as inducing nastic movement, bending and swelling, proliferation, and overgrowth of leaves and stems, control of root growth, development of callous tissue, increased cambial activity, deposition of new cell wall and abscission tissue, and the initiation of new roots on stems and leaves. The practical aspects of these properties include propagation of plants from cuttings, hastening of flower bud formation, "hormonization" of cereal grains for controlling germination and growth, parthenogenic development of fruit, delaying or controlling the fall of leaves, buds and fruit, and inhibiting sprouting, budding or flowering.

In the successful application of plant regulants to various of these purposes it is important that the concentration of the compound in a suitable treating medium and the time of treatment, both of which, particularly with some compounds, are highly critical, be adjusted carefully. If this concentration/time factor is exceeded by using either a higher concentration or longer treating time the regulating effect may vanish and instead considerable injury to the plant develop.

Of the various types of known plant regulants, a summary of which may be found in U. S. Patent 2,220,505, 1-naphthaleneacetic acid has probably obtained the most significance in the art. On the basis of cost efficiency and case of synthesis it appears to be most outstanding, yet its synthesis is by no means simple and its range of tolerance is too sharp to provide sufficient margin of safety in the hands of unskilled workmen.

I have now found that the mononaphthyl and the monochloronaphthyl ethers of the aliphatic hydrocarbon diols having not more than four carbon atoms between the hydroxyl groups have plant regulating properties and may be applied to plants for the purpose of regulating their growth characteristics with a large measure of success and a wide margin of safety.

The compounds to which this invention is directed may be represented by the general formula ROR'OH in which R is a naphthalene or monochloronaphthalene ring and R' is a bivalent aliphatic hydrocarbon radical having not more than four carbon atoms. For example, R may be 1-naphthyl, 2-naphthyl or 2-chloro-1-naphthyl radicals and R' may be ethylene, propylene, isopropylene, butylene and isobutylene radicals. Various position isomers are possible and mixtures of them are suitable.

These compounds may be prepared by the condensation of a suitable naphthol and a suitable glycol or glycolhydrin according to principles and practices well known in the art. By this method or by any other suitable method a large variety of compounds typified by those listed below may be synthesized from available raw materials economically and without difficulty: Mono-alpha-naphthyl ether of ethylene glycol, the mono-beta-naphthyl ether of ethylene glycol, the mono-alpha-naphthyl ether of 1,3-propylene glycol, the mono-beta-naphthyl ether of 1,3-propylene glycol, the mono-alpha-naphthyl ether of 1,4-butylene glycol, the mono-beta-naphthyl ether of 1,4-butylene glycol.

The compounds of this invention may be used in a variety of ways to regulate the growth characteristics of the plant. For example, they may be applied to cuttings to stimulate root formation, they may be applied to ornamental plants to delay fall of leaves and needles; they may be applied to fruit trees to delay or prevent pre-harvest drop; they may be applied to seeds, tubers and the like for regulating germination, to stimulate or inhibit sprouting or to stimulate development of roots; they may be used for "fortifying" fertilizers and plant food; and they may be used in the production of parthenocarpic or seedless varieties of fruits and berries. In their various applications they may be used on seeds or mature plants to regulate the development of the plants when desired to avoid drought, frost and other adverse conditions, or to stimulate root activity in cuttings or transplanted plants, or to modify the abscission cells to prevent premature drop of buds, leaves, and fruit, particularly apples. In all their applications they are applied to living plant cells in such concentrations as will regulate or control the growth characteristics of the plant. For the purpose of this invention it will be understood that the term "plant" as used herein and in the appended claims is intended to include seeds.

In the application of the compound for these various purposes different compositions may be employed. For the most part aqueous solutions will be found most desirable. These solutions may include wetting agents or adhesives, or both. Colloidal materials, such as the soluble gums or resins, may be included; also, water-soluble polymers such as polyvinyl alcohol. The compounds also may be applied in admixture with other diluents either as pastes or dusts. Thus the materials may be incorporated in oils, fats, or similar vehicles such as lanolin, olive oil, paraffin oil, lard or hydrogenated vegetable oils, or in a finely divided inert material such as talc, flour, fuller's earth, clay or other soluble or insoluble finely divided solids.

Example 1

A series of 20 carnation cuttings is soaked for 3½ hours at room temperature with an aqueous solution containing 60 milligrams of beta-2-naphthoxyethanol per liter while a second series is simply soaked in water for purposes of comparison. The cuttings are then placed in a clean sand and watered occasionally. After 2-3 weeks the cuttings are examined for the extent of rooting. The results are indicated in the following table:

| Series | Extent of rooting | | | |
|---|---|---|---|---|
| | Heavy | Medium | Light | No roots |
| Treated | ¹17 | 2 | 0 | 1 |
| Water check | 1 | 2 | 9 | 8 |

¹ Eight of these are very heavily rooted.

These results show definite root stimulating effect as evidenced from the larger number of heavy rootings and illustrates the application of the invention to the propagation of plants from cuttings. This treatment is equally applicable to other varieties of plants and is useful for the propagation of not only the ornamental and flowering variety of plants such as holly, Taxus, Forsythia, Althea, barberry, quince, Hydrangea, lilac, privet, rose, Spirea, bittersweet and others, but also for economically important plants such as apple, grape, citrus, peach, pear, etc. For such propagations either dilute aqueous solutions of the synthetic plant hormone in concentrations ranging from 3 to 200 milligrams per liter or compounded dusts or powders containing 0.1 to 5 per cent or more of the active ingredient may be used. The concentration will necessarily depend upon the variety or species of plants which, of course, vary in their sensitivity to such treatment. The duration of treatment or exposure to these stimulants will vary from about 1 hour to 2 or more days, again depending upon the plant and the concentration.

In comparing the intensity of the hormone-like activity of compounds it is customary to apply lanolin pastes of the compound to two-week old tomato seedlings. The paste is applied to the stem at and below the highest branch or internode by means of a glass rod. Typical hormone-like effects are characterized by epinasty of the leaves and curvature of the stem occurring within several hours and by callous tissue developing at the point of application after several days. Such hormone-like responses characterize such known synthetic plant hormones as gamma-3-indolebutyric acid and 1-naphthaleneacetic acid, and in a comparable manner such materials within the scope of my invention as beta-1-naphthoxyethanol (the mono-alpha-naphthyl ether of ethylene glycol), beta-2-naphthoxy-ethanol (the mono-beta-naphthyl ether of ethylene glycol), and beta-(2-chloro-1-naphthoxy)ethanol.

The superficial effects characterized by swelling, twisting, and bending of the test plant and development of callous tissue is presumably due to some specific action on the cellular development of the plant, particularly the cell wall tissue. For this reason, the synthetic plant hormones are effective in regulating the deposition of abscission tissue connecting the plant organs, leaves, blossoms, and fruit to the plant stem or stamen. From the practical standpoint, therefore, the present synthetic plant hormones are useful in controlling or delaying the fall of leaves, blooms, and fruit. The following example illustrates an important application to cut evergreens such as Christmas trees.

Example 2

A number of white spruce (New Hampshire) limbs are thoroughly sprayed with a 1/10,000 water solution of beta-2-naphoxyethanol and then placed in a constant temperature room running at 82° F. and about 30 per cent relative humidity. For purposes of comparison, a control group is simply sprayed with water. Six days later the weight of drop needles and needles remaining on the limbs is determined and the per cent calculated. The results are summarized as follows:

| Treatment | Drop |
|---|---|
| | *Percent* |
| With beta-2-naphthoxyethanol | 4.4 |
| Water check | 100.0 |

It will be seen that the abscission of the needles is decreased at least twenty-fold by the above threament, thus extending the good appearance of such cut ornamental plants.

The present compounds can also be applied to plants not only for delaying the abscission of leaves and needles but also for preventing the premature fall of fruits, particularly apples. For such an application, the compounds are applied several days in advance of the time at which these falls are apt to occur. Such varieties of apple as Stayman Winesap, Delicious, McIntosh, and Williams are effectively prevented from premature falling or wind falling by this treatment. The application is carried out by mixing the compound with a suitable diluent or powdery carrier and thus may be sprayed or dusted on the plant or tree. For spraying purposes, a water solution, suspension, or emulsion containing from 1–200 grams per 100 gallons of water or approximately from a dilution of 1/400,000 to 1/2,000 can be used. With such sprays may be incorporated other adjuvants serving to improve contact and coverage on the tree or plant. Compositions of talc, clay, flour, and the like, containing from 2 to 100 parts per 100,000 can also be used. Such compositions may vary in these limits depending upon the type of plant, time and frequency of treatment. In some cases even lower or higher concentrations may be necessary.

The compounds of this invention are very useful in regulating the germination of seeds and tubers as well as the growth of plants therefrom. For this purpose they may be applied by either mixing the seeds with dusts made from talc, clay, or flour or by immersing the seeds in dilute aqueous solution or suspension. The treatment of seeds may also be carried out simultaneously with any treatments for preventing rot or any fungus attack on the seeds. In applying the dust treatment the concentration of active ingredient should be from 0.5 to 5 per cent, while a much lower concentration will suffice for the aqueous solution, namely from 0.005 to 0.5 per cent.

Another method for regulating plant growth by the use of the present compounds consists of incorporating these mononaphthyl and monochloronaphthyl glycol ethers in fertilizers and plant foods or nutrients such as manure, bone meal, peat, ground hulls, dried blood, ground phosphate, potash, and urea products. This may be regarded as fortifying the plant foods. To obtain a uniform mixture the present compounds may be added in pure form or, preferably, diluted with a dust or water solution, dusted or sprayed into the fertilizer and then mixed either by spading or, with large quantities, in the usual type of mixing mills. For such hormonized fertilizers, the suitable concentrations will range from 0.002 oz. to 0.2 oz. per ton of fertilizer.

Another application of the synthetic plant hormones for which the present compounds are also particularly suitable is the production of parthenocarpic or seedless variety of fruit. This is accomplished more expeditiously, particularly on large scale by spraying the flower buds, preferably several times while flowering continues, with dilute aqueous solutions of the compounds, ranging from a concentration of 0.05 to 1.0 g. or more per liter. The concentration for the optimum results will vary with the variety of plant, season, frequency of treatment, etc. Parthenocarpic or seedless fruit can thus be developed in the case of such plants as tomato, squash, cucumber, water-melon, pepper, eggplant, etc.

While I have disclosed my invention with reference to particular applications it is to be understood that it is not limited in these respects but is directed to the application of the particular regulant described in any manner which leads to alteration, i. e., regulation and control, of the growth characteristics of plants. The general characteristic of a plant stimulant is that of modifying the development of the plant, not simply as in the case of a fertilizer by providing a more proper food but actually by altering and controlling the growth characteristics of the plant in the various ways already set forth, nor are they to be confused with plant poisons which simply alter and destroy. Additionally, the plant stimulant is effective in minute amounts, the effective concentration being easily set forth in parts per million or milligrams per liter.

Since many widely differing embodiments of the invention may be made it is to be understood that such modifications as come within the spirit of the invention are intended to be included within the scope of the claims.

I claim:

1. A plant regulant composition containing as an essential active ingredient a compound selected from the class consisting of mononaphthyl and monochloronaphthyl ethers of aliphatic hydrocarbon diols having not more than four carbon atoms between the hydroxyl groups.

2. A plant regulant composition containing as an essential active ingredient a compound of the formula ROR'OH in which R is selected from the class consisting of naphthalene and monochloronaphthalene rings and R' is a bivalent aliphatic hydrocarbon radical having not more than four carbon atoms.

3. A plant regulant composition containing as an essential active ingredient a mononaphthyl ether of an aliphatic hydrocarbon diol having not more than four carbon atoms between the hydroxyl groups.

4. A plant regulant composition containing as an essential active ingredient a monochloronaphthyl ether of an aliphatic hydrocarbon diol having not more than four carbon atoms between the hydroxyl groups.

5. A plant regulant composition containing as an essential active ingredient a mononaphthyl ether of ethylene glycol.

6. A plant regulant composition containing as an essential active ingredient a monochloronaphthyl ether of ethylene glycol.

7. In the propagation of plants the method of regulating the growth characteristics of the plants which comprises treating the plant with a compound selected from the class consisting of mononaphthyl and monochloronaphthyl ethers of aliphatic hydrocarbon diols having not more than four carbon atoms between the hydroxyl groups.

8. In the propagation of plants the method of regulating the growth characteristics of the plants which comprises treating the plant with a compound of the formula ROR'OH in which R is selected from the class consisting of naphthalene and monochloronaphthalene rings and R' is a bivalent aliphatic hydrocarbon radical having not more than four carbon atoms.

9. In the propagation of plants the method of regulating the growth characteristics of the plants which comprises treating the plant with a mononaphthyl ether of an aliphatic hydrocarbon diol having not more than four carbon atoms between the hydroxyl groups.

10. In the propagation of plants the method of regulating the growth characteristics of the plants which comprises treating the plant with a monochloronaphthyl ether of an aliphatic hydrocarbon diol having not more than four carbon atoms between the hydroxyl groups.

11. In the propagation of plants the method of regulating the growth characteristics of the plants which comprises treating the plant with a mononaphthyl ether of ethylene glycol.

12. In the propagation of plants the method of regulating the growth characteristics of the plants which comprises treating the plant with a monochloronaphthyl ether of ethylene glycol.

13. An anti-drop composition for delaying the separation of parts of plants due to deterioration of the absciss layer which contains as an essential active ingredient a compound selected from the class consisting of mononaphthyl and monochloronaphthyl ethers of aliphatic hydrocarbon diols having not more than four carbon atoms between the hydroxyl groups.

14. An anti-drop composition for delaying the separation of parts of plants due to deterioration of the absciss layer which contains as an essential active ingredient a compound selected from the class consisting of mononaphthyl and monochloronaphthyl ethers of ethylene glycol.

15. In the propagation of plants the method of retarding normal separation of parts due to deterioration of the absciss layer which comprises treating at the iminence of abscission at least a portion of the plant having absciss layers with a compound selected from the class consisting of mononaphthyl and monochloronaphthyl ethers of aliphatic hydrocarbon diols having not more than four carbon atoms between the hydroxyl groups.

16. In the propagation of plants the method of retarding normal separation of parts due to deterioration of the absciss layer which comprises treating at the iminence of abscission at least a portion of the plant having absciss layers with a compound selected from the class consisting of mononaphthyl and monochloronaphthyl ethers of ethylene glycol.

17. An anti-drop composition for use in delaying separation of parts of plants due to deterioration of the absciss layer comprising an admixture with a water-soluble diluent a compound selected from the class consisting of mononaphthyl and monochloronaphthyl ethers of ethylene glycol.

18. A fortified plant nutrient composition comprising plant nutriment and a small amount of a compound selected from the class consisting of mononaphthyl and monochloronaphthyl ethers of ethylene glycol.

JOHN F. LONTZ.

CERTIFICATE OF CORRECTION.

Patent No. 2,322,759.   June 29, 1943.

JOHN F. LONTZ.

It is hereby certified that error appears in the printed specification of the above numbered patent requiring correction as follows: Page 1, first column, line 1, for "plane" read --plant--; and second column, line 1, for "tnd" read --and--; line 18, for "case" read --ease--; page 4, second column, line 17, claim 17, for "an" read --in--; and that the said Letters Patent should be read with this correction therein that the same may conform to the record of the case in the Patent Office.

Signed and sealed this 7th day of September, A. D. 1943.

(Seal)

Henry Van Arsdale,
Acting Commissioner of Patents.